United States Patent
Hou et al.

(10) Patent No.: US 10,728,507 B2
(45) Date of Patent: Jul. 28, 2020

(54) PROJECTOR AND OPTICAL ENGINE MODULE

(71) Applicant: Coretronic Corporation, Hsin-Chu (TW)

(72) Inventors: Kai-Lun Hou, Hsin-Chu (TW); Te-Tang Chen, Hsin-Chu (TW); Wei-Min Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/846,840

(22) Filed: Sep. 7, 2015

(65) Prior Publication Data
US 2016/0309125 A1    Oct. 20, 2016

(30) Foreign Application Priority Data

Apr. 15, 2015    (TW) .............................. 104112062 A

(51) Int. Cl.
*H04N 9/31*        (2006.01)
*G03B 21/16*       (2006.01)

(52) U.S. Cl.
CPC ........... *H04N 9/3144* (2013.01); *G03B 21/16* (2013.01); *H04N 9/3197* (2013.01)

(58) Field of Classification Search
CPC ............ H04N 9/31–3197; G03B 21/16; G02B 7/181; G02B 7/1815; G02B 7/008
See application file for complete search history.

(56) References Cited

U.S. PATENT DOCUMENTS

| 2002/0163625 A1* | 11/2002 | Tabuchi ................. G02B 5/003 353/31 |
| 2005/0237620 A1* | 10/2005 | Hsu ........................ G02B 7/181 359/618 |
| 2006/0262233 A1 | 11/2006 | Uehara et al. |
| 2008/0024733 A1* | 1/2008 | Gerets ............... G02F 1/133553 353/52 |

(Continued)

FOREIGN PATENT DOCUMENTS

| CN | 202600344 | 12/2012 |
| EP | 2402797 | 1/2012 |

(Continued)

OTHER PUBLICATIONS

"Office Action of China Counterpart Application", dated Jun. 28, 2017, p. 1-p. 7, in which the listed references were cited.

*Primary Examiner* — Michelle M Iacoletti
*Assistant Examiner* — Christopher A Lamb, II
(74) *Attorney, Agent, or Firm* — JCIPRNET

(57) ABSTRACT

A projector includes a light source, an optical engine module, and a projection lens. The light source is configured for providing an illumination beam. The optical engine module includes a light valve, a casing, and a heat conducting structure. The light valve is configured to convert the illumination beam into an image beam. The light valve has a front portion and a rear portion opposite to each other. The casing is connected to the front portion. The heat conducting structure is disposed on the casing and at at least one side of the front portion. The projection lens is disposed on the casing and configured to project an image. The heat conducting structure is configured to dissipate heat of the casing and the front portion of the light valve.

12 Claims, 4 Drawing Sheets

(56) References Cited

U.S. PATENT DOCUMENTS

| | | |
|---|---|---|
| 2008/0030688 A1 | 2/2008 | Lee |
| 2008/0043439 A1 | 2/2008 | Lin et al. |
| 2009/0046425 A1* | 2/2009 | Kavanagh .............. G03B 21/16 361/695 |
| 2009/0213339 A1* | 8/2009 | Huang ................... G03B 21/16 353/52 |
| 2011/0019161 A1* | 1/2011 | Chen ...................... G03B 21/16 353/61 |
| 2011/0242499 A1* | 10/2011 | Terao ..................... G03B 21/16 353/57 |
| 2012/0081617 A1* | 4/2012 | Cho ....................... G03B 21/16 348/748 |
| 2014/0000851 A1* | 1/2014 | Wang ..................... F28D 15/02 165/104.26 |

FOREIGN PATENT DOCUMENTS

| | | |
|---|---|---|
| TW | 468801 | 12/2001 |
| TW | 200535550 | 11/2005 |
| TW | 200812466 | 3/2008 |
| TW | I343507 | 6/2011 |
| TW | I356274 | 1/2012 |
| TW | 201400972 | 1/2014 |

* cited by examiner

PROJECTOR AND OPTICAL ENGINE MODULE

CROSS-REFERENCE TO RELATED APPLICATION

This application claims the priority benefit of Taiwan application serial no. 104112062, filed on Apr. 15, 2015. The entirety of the above-mentioned patent application is hereby incorporated by reference herein and made a part of this specification.

BACKGROUND OF THE INVENTION

Field of the Invention

The invention relates to an optical apparatus and an optical module, and more particularly, to a projector and an optical engine module.

Description of Related Art

A projector uses a light valve to convert an illumination beam from a light source into an image beam, and uses a projection lens to convert the image beam into a projection beam which is projected outside. As the brightness of the projector becomes higher, the heat generated by the light valve increases correspondingly. To prevent the light valve being overheated, many methods for heat dissipation, such as increasing volume of a heat dissipation module and equipping a heat dissipation fan, are used to increase the heat dissipation efficiency of the light valve. However, using those methods will increase a volume of the projector significantly and make excessive noise. In addition, the heat dissipation module is only disposed at a rear end of the light valve and the heat of a front end of the light valve could not be effectively dissipated. Therefore, a temperature difference between the front end and the rear end of the light valve is large, which generate an unexpected internal stress, and thus, operating life of the light valve becomes shorter.

The information disclosed in this "Description of Related Art" section is only for enhancement understanding of the background of the invention and therefore it may contain information that does not form the prior art that is already known to a person of ordinary skill in the art. Furthermore, the information disclosed in this "Description of Related Art" section does not mean that one or more problems to be solved by one or more embodiments of the invention were acknowledged by a person of ordinary skill in the art.

SUMMARY OF THE INVENTION

The invention provides a projector and an optical engine module which can dissipate heat of a light valve effectively.

Other objectives and advantages of the invention can be further illustrated by the technical features broadly embodied and described as follows.

To achieve one, a part, or all of the above advantages or other advantages, one embodiment of the invention provides a projector which includes a light source, an optical engine module, and a projection lens. The light source is configured for providing an illumination beam. The optical engine module includes a light valve, a casing, and a heat conducting structure. The light valve is configured to convert the illumination beam into an image beam. The light valve has a front portion and a rear portion opposite to each other. The casing is connected to the front portion. The heat conducting structure is disposed on the casing and at at least one side of the front portion. The projection lens is disposed on the casing and configured to project an image.

To achieve one, a part, or all of the above advantages or other advantages, one embodiment of the invention provides an optical engine module. The optical engine module includes a light valve, a casing, and a heat conducting structure. The light valve has a front portion and a rear portion opposite to each other. The casing is connected to the front portion. The heat conducting structure is disposed on the casing and at at least one side of the front portion.

In one embodiment of the invention, the optical engine module further includes a rear end heat dissipation module, the rear end heat dissipation module is disposed on the rear portion.

In one embodiment of the invention, the optical engine module further includes a front end heat dissipation module, and the front end heat dissipation module is connected to the heat conducting structure.

In one embodiment of the invention, the front end heat dissipation module includes a heat dissipation fin set and at least one heat pipe. The heat pipe is connected between the heat conducting structure and the heat dissipation fin set.

In one embodiment of the invention, the front end heat dissipation module includes a heat dissipation fin set and at least one water-cooling pipe. The water-cooling pipe is connected between the heat conducting structure and the heat dissipation fin set.

In one embodiment of the invention, the optical engine module further includes at least one thermoelectric cooler (TEC), and the thermoelectric cooler is disposed between the casing and the heat conducting structure.

In one embodiment of the invention, the optical engine module further includes an off ray receiving plate. The off ray receiving plate is disposed on the casing and configured to receive an off ray from the light valve. At least one portion of the heat conducting structure is located between the front portion and the off ray receiving plate.

In one embodiment of the invention, the heat conducting structure at least partially surrounds the front portion.

The embodiments of the invention have at least one of the following advantages. In the embodiments of the invention, the heat conducting structure is disposed on the casing of the optical engine module, and the heat conducting structure is at at least one side of the front portion of the light valve. The heat generated by the light valve being operated is not only dissipated via the rear end heat dissipation module of the rear portion, but also dissipated via the heat conducting structure at at least one side of the front portion and the corresponding front end heat dissipation module. As a result, the heat dissipation efficiency of the light valve is enhanced, and the temperature difference between the front portion and the rear portion of the light valve becomes smaller, so as to elongate the operating life of the light valve. In the embodiments of the invention, the heat conducting structure is connected to the casing and receives the heat from the light valve via the casing. Namely, the heat conducting structure is not directly connected to the light valve and is separated from the light valve. Therefore, the assembling/positioning accuracy of the light valve will not be affected by disposing the heat conducting structure, so as to obtain a high projecting quality of the projector. Furthermore, in the embodiments of the invention, the heat conducting structure disposed on the casing could dissipate the heat of the casing effectively so that a high efficiency of heat dissipation of other optical elements disposed inside the casing is obtained.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
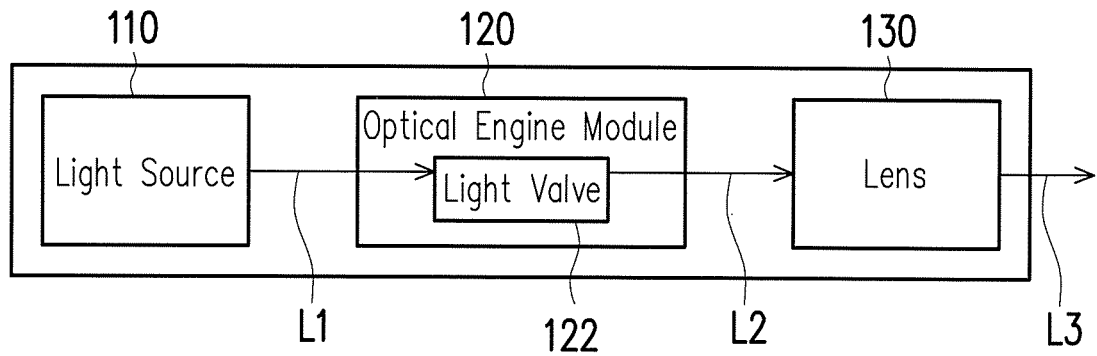
FIG. 1 is a schematic block diagram of a projector of one embodiment of the invention.

FIG. 1 is a schematic block diagram of a projector of one embodiment of the invention. Referring to FIG. 1, a projector 100 of the embodiment includes a light source 110, an optical engine module 120, and a projection lens 130. The light source 110 is configured to provide an illumination beam L1. The light source 110, for example, includes at least one of a light emitting diode (LED), a laser diode, an ultra-high pressure mercury lamp, solid-sate light source, or other suitable light source. The optical engine module 120 includes a light valve 122. The light valve 122 may be at least one of a digital micromirror device (DMD), a liquid crystal on silicon (LCOS), or other suitable element. The light valve 122 is configured to convert the illumination beam L1 into an image beam L2. The projection lens 130 is configured to convert the image beam L2 into a projection beam L3 so as to project an image (not shown) external to the projector 100 on a surface (not shown).

Figure 2:
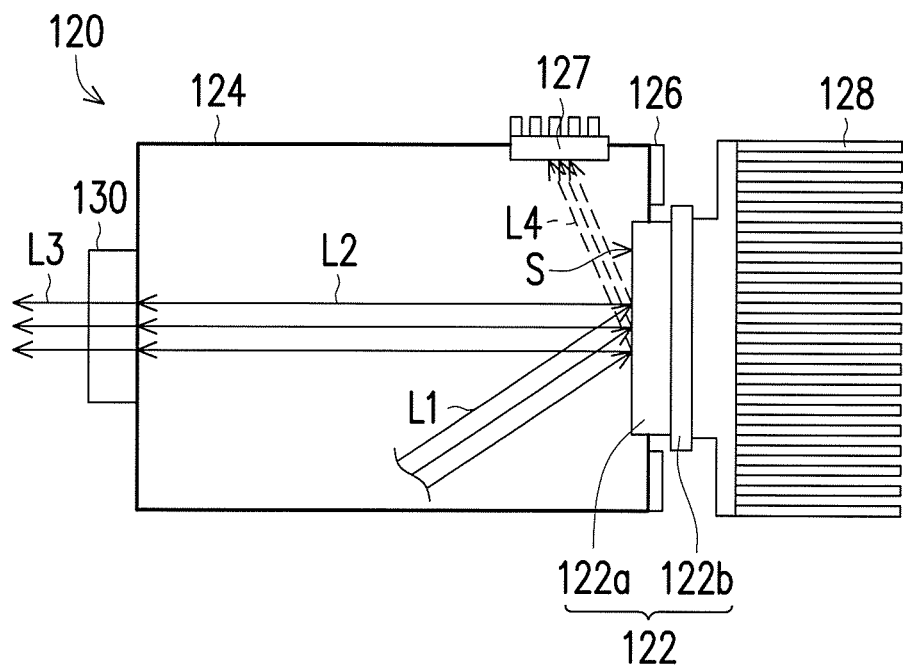
FIG. 2 is a schematic side view of an optical engine module and a projection lens of the projector of one embodiment of the invention.
Figure 3:
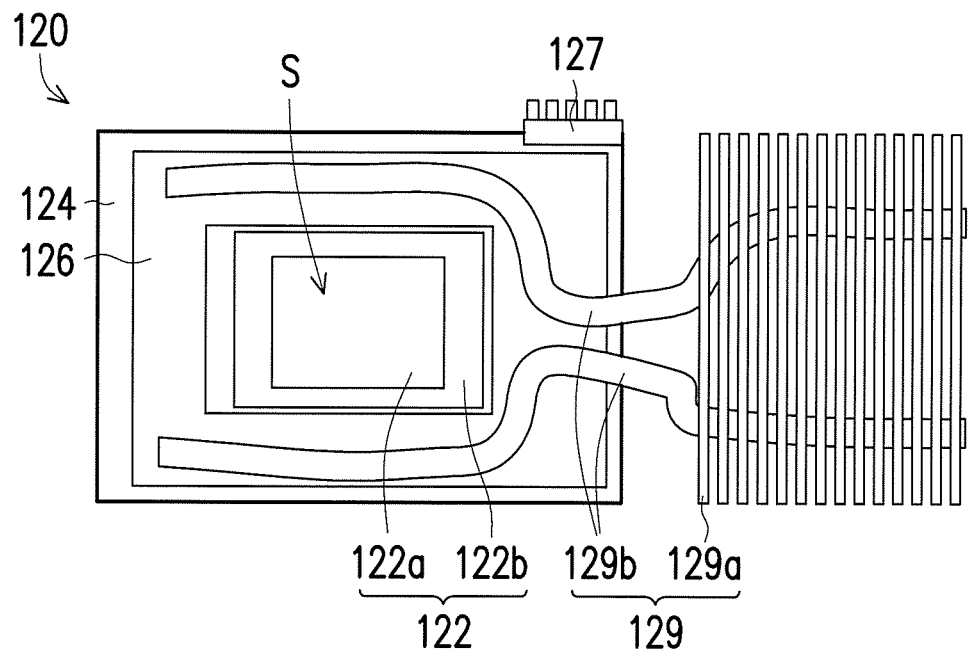
FIG. 3 is a schematic back view of the optical engine module in FIG. 2.

FIG. 2 is a schematic side view of an optical engine module and a projection lens of the projector of one embodiment of the invention. FIG. 3 is a schematic back view of the optical engine module in FIG. 2. To make the drawings clear, FIG. 3 does not show a rear end heat dissipation module 128 in FIG. 2, and FIG. 2 does not show a front end heat dissipation module 129 in FIG. 3. Referring to FIG. 2 and FIG. 3, the light valve 122 of the embodiment has a front portion 122a and a rear portion 122b opposite to each other. The optical engine module 120 further includes a casing 124 and a heat conducting structure 126. The casing 124 is connected to the front portion 122a of the light valve 122, wherein the front portion 122a of the light valve 122 is positioned by leaning against the casing 124. In this embodiment, the heat conducting structure 126 is, for example, a heat-conducting base, and is made of metal material (a copper heat dissipation structure), but the invention is not limited thereto. In this embodiment, the heat conducting structure 126 is disposed on the casing 124 and at least partially surrounds the front portion 122a of the light valve 122. The projection lens 130 is disposed on the casing 124. In this embodiment, the light valve 122 has a reflective surface S. The reflective surface S is located at the front portion 122a and configured to reflect light beams from the light source 110 (as shown in FIG. 1) to the projection lens 130.

In this embodiment, the optical engine module 120 further includes the rear end heat dissipation module 128 (as shown in FIG. 2) and the front end heat dissipation module 129 (as shown in FIG. 3). In this embodiment, the rear end heat dissipation module 128, such as a heat dissipation fin set, is disposed on the rear portion 122b of the light valve 122 and configured to dissipate heat of the rear portion 122b. In other embodiments, the rear end heat dissipation module could further include a heat pipe or a water-cooling pipe connected between a heat dissipation fin set and the rear portion 122b, but the invention is not limited thereto. In this embodiment, the front end heat dissipation module 129 includes a heat dissipation fin set 129a and at least one heat pipe 129b (two are depicted as an example). The heat pipes 129b are connected between the heat conducting structure 126 and the heat dissipation fin set 129a. Therefore, the heat of the font portion 122a of the light valve 122 is sequentially transferred from the casing 124, the heat conducting structure 126 the heat pipe 129b, and to the heat dissipation fin set 129a. In other embodiments, the heat pipes 129b could be replaced by water-cooling pipes (not shown), so as to transfer the heat from the heat conducting structure 126 to the heat dissipation fin set 129a by water-cooling manner. The way and position of the arrangement of the heat pipes 129b in FIG. 3 is only exemplary and the invention is not limited thereto. The heat pipes 129b of the invention are not necessary curved and are not necessary disposed at the top side and bottom side of the casing 124 adjacent to the front portion 122a of the light valve 122 (as observed from FIG. 2). The heat pipes 129b may be disposed based on, for example, the position, size, and the number of the heat dissipation fin set 129a. For example, the heat pipes 129b may be straight or may be disposed at either side or any two or more sides of the casing 124 adjacent to the front portion 122a of the light valve 122.

In the embodiment exemplarily illustrated in FIG. 3, the heat conducting structure 126 is disposed on the casing 124 of the optical engine module 120, and the heat conducting structure surrounds the front portion 122a of the light valve 122. Hence, the heat generated by the light valve 122 when being operated is not only dissipated via the rear end heat dissipation module 128 located at the rear portion 122b, but also dissipated via the heat conducting structure 126 surrounding the front portion 122a and the corresponding front end heat dissipation module 129. As a result, the heat dissipation efficiency of the light valve 122 is enhanced, and the temperature difference between the front portion 122a and the rear portion 122b of the light valve 122 becomes smaller, so as to elongate the operating life of the light valve. Therefore, there is no need to increase volume of the heat dissipation module or equip a heat dissipation fan for increasing heat dissipation efficiency of the light valve 122, so as to prevent significantly increasing volume of the projector or making excessive noise.

In addition, in this embodiment, the heat conducting structure 126 is connected to the casing 124 and receives the heat from the light valve 122 via the casing 124. Namely, the heat conducting structure 126 is not directly connected to the light valve 122 and is separated from the light valve 122. Therefore, the assembling/positioning accuracy of the light valve 122 will not be affected by disposing the heat conducting structure 126, so as to obtain a high projecting quality of the projector 100. Furthermore, the heat conducting structure 126 disposed on the casing 124 can dissipate the heat of the casing 124 effectively so that a high efficiency of heat dissipation of other optical elements disposed inside the casing 124 is obtained.

In this embodiment, the optical engine module 120 may further include an off ray receiving plate 127. The off ray receiving plate 127 is disposed on the casing 124 and configured to receive an off ray L4 (i.e. the ray or light beams not entering the projection lens) from the light valve 122. As shown in FIG. 2 and FIG. 3, one portion of the heat conducting structure 126 is located between the front portion 122a of the light valve 122 and the off ray receiving plate 127. Thus, the heat generated by the off ray receiving plate 127 receiving the off ray L4 is conducted to the front end heat dissipation module 129 through the heat conducting structure 126, so as to prevent the heat generated by the off ray receiving plate 127 from transferring to the front portion 122a of the light valve 122 via the casing 124.

Figure 4:
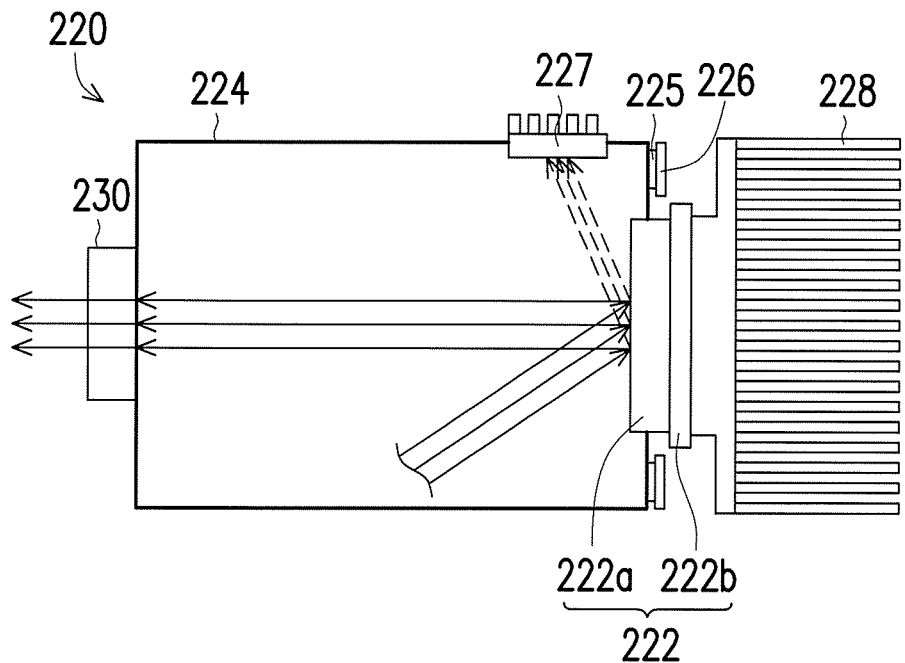
FIG. 4 is a schematic side view of an optical engine module and a projection lens of another embodiment of the invention.
Figure 5:
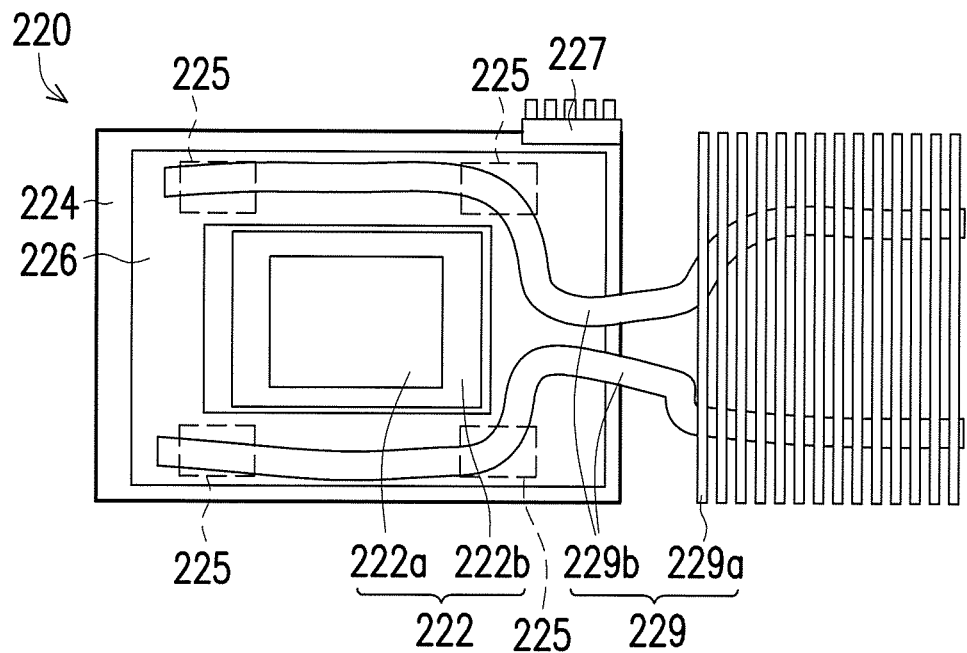
FIG. 5 is a schematic back view of the optical engine module in FIG. 4.

FIG. 4 is a schematic side view of an optical engine module and a projection lens of another embodiment of the invention. FIG. 5 is a schematic back view of the optical engine module in FIG. 4. In the embodiment shown in FIG. 4 and FIG. 5, the configuration of the optical engine module 220, the light valve 222, the front portion 222a, the rear portion 222b, the casing 224, the heat conducting structure 226, the rear end heat dissipation module 228, the front end heat dissipation module 229, the heat dissipation fin set 229a, the heat pipe 229b, the off ray receiving plate 227, the projection lens 230 is similar to the configuration of the optical engine module 120, the light valve 122, the front portion 122a, the rear portion 122b, the casing 124, the heat conducting structure 126, the rear end heat dissipation module 128, the front end heat dissipation module 129, the heat dissipation fin set 129a, the heat pipe 129b, the off ray receiving plate 127, the projection lens 130 as shown in FIG. 2 and FIG. 3, and the details are not mentioned again.

The main difference between the embodiment shown in FIGS. 4, 5 and the embodiment shown in FIGS. 2, 3 is that the optical engine module 220 further includes at least one thermoelectric cooler (TEC) 225 (more than one is shown as an example in FIG. 4 and FIG. 5). The thermoelectric cooler 225 is disposed between the casing 224 and the heat conducting structure 226, and contacts the casing 224 and the heat conducting structure 226, so as to dissipate heat of the casing and transfer heat of the casing 224 to the heat conducting structure 226.

Figure 6:
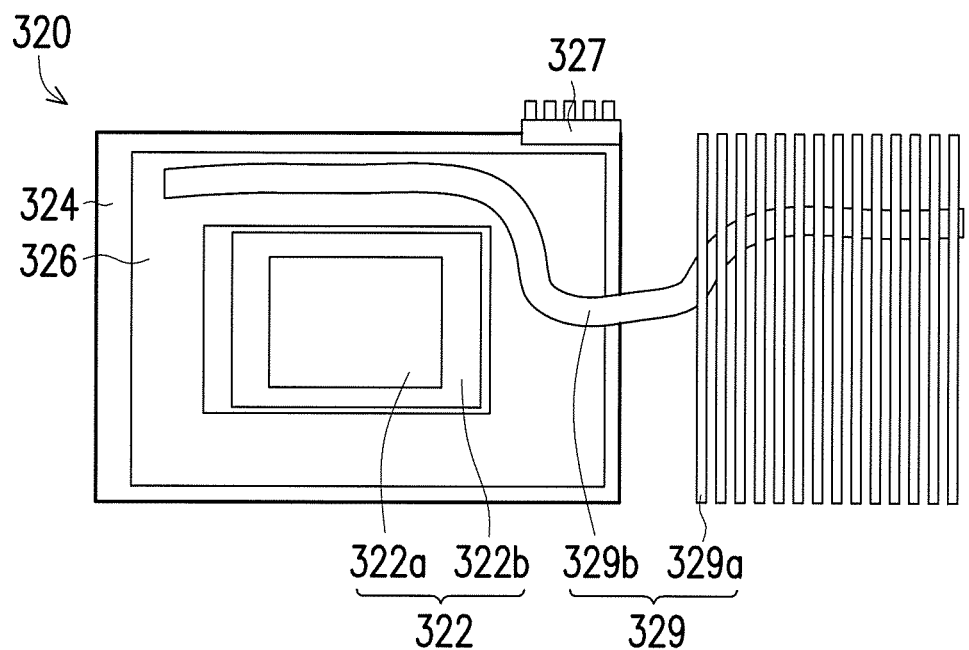
FIG. 6 is a schematic back view of an optical engine module of another embodiment of the invention.

FIG. 6 is a schematic back view of an optical engine module of another embodiment of the invention. In the embodiment shown in FIG. 6, the configuration of the optical engine module 320, the light valve 322, the front portion 322a, the rear portion 322b, the casing 324, the heat conducting structure 326, the front end heat dissipation module 329, the heat dissipation fin set 329a, the heat pipe 329b, and the off ray receiving plate 327 is similar to the configuration of the optical engine module 120, the light valve 122, the front portion 122a, the rear portion 122b, the casing 124, the heat conducting structure 126, the front end heat dissipation module 129, the heat dissipation fin set 129a, the heat pipe 129b, and the off ray receiving plate 127 as shown in FIG. 3, and the details are not mentioned again. The main difference between the embodiment shown in FIG. 6 and the embodiment shown in FIG. 3 is that the front end heat dissipation module 329 in FIG. 6 has only one heat pipe 329b, but the front end heat dissipation module 129 in FIG. 3 has two heat pipes 129b. In some embodiments, the front end heat dissipation module 329 as depicted in FIG. 6 could have a plurality of branch structures (not shown). However, in other embodiments, the front end heat dissipation module could have an appropriate number of heat pipes, and the invention is not limited thereto.

Figure 7:
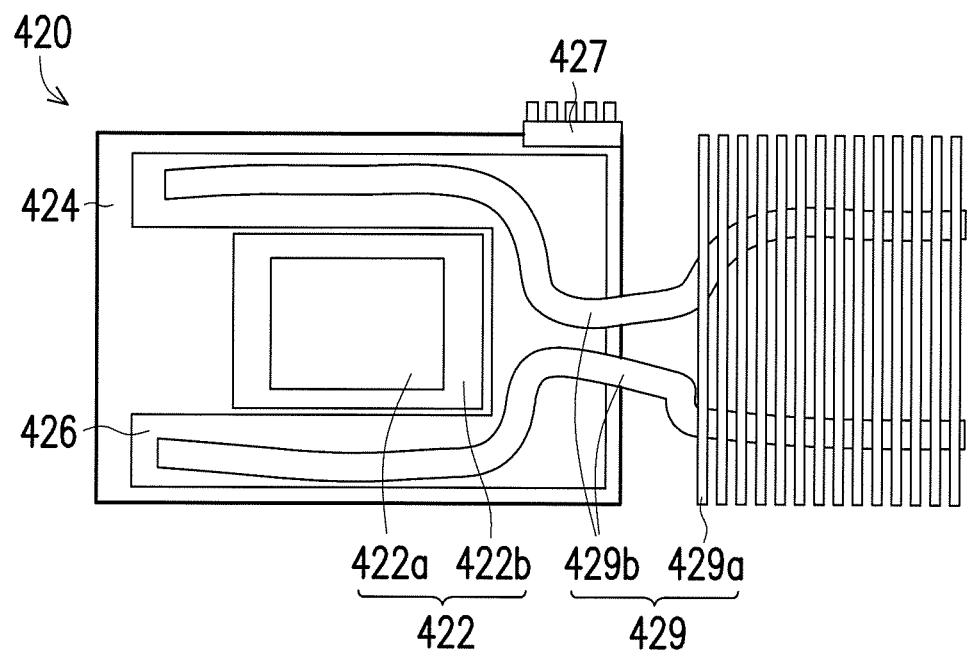
FIG. 7 is a schematic back view of an optical engine module of another embodiment of the invention.

FIG. 7 is a schematic back view of an optical engine module of another embodiment of the invention. In the embodiment shown in FIG. 7, the configuration of the optical engine module 420, the light valve 422, the front portion 422a, the rear portion 422b, the casing 424, the heat conducting structure 426, the front end heat dissipation module 429, the heat dissipation fin set 429a, the heat pipe 429b, and the off ray receiving plate 427 is similar to the configuration of the optical engine module 120, the light valve 122, the front portion 122a, the rear portion 122b, the casing 124, the heat conducting structure 126, the front end heat dissipation module 129, the heat dissipation fin set 129a, the heat pipe 129b, and the off ray receiving plate 127, and the details are not mentioned again. The main difference between the embodiment shown in FIG. 7 and the embodiment shown in FIG. 3 is that only a portion of the front portion 422a of the light valve 422 in FIG. 7 is surrounded by the heat conducting structure 426, but all of the front portion 122a of the light valve 122 in FIG. 3 is surrounded by the heat conducting structure 126.

The arrangement of the heat conducting structure in the embodiments of the invention is not limited to the disclosure mentioned above. For example, when there is only one heat pipe 329b in the front end heat dissipation module 329 as exemplarily indicated in FIG. 6, the heat conducting structure disposed on the casing 324 may be arranged in L shape and partially surrounds two adjacent sides of the front portion 322a of the light valve 322, or disposed on the casing 324 and at the at least one side of the front portion 322a (e.g. at the position corresponding to the heat pipe 329b as indicated in FIG. 6. In other words, the heat conducting structure may be at the top side of the front portion 322a as exemplarily observed from FIG. 6). In the embodiment as indicated in FIG. 7, the heat conducting structure 426 is arranged in U shape and partially surrounds the front portion 422a of the light valve 422. In other embodiment, the heat conducting structure 426 may be in the form of two separate parts and partially surrounds the front portion 422a of the light valve 422 by disposing the two separate parts of the heat conducting structure 426 respectively at the two opposite sides of the front portion 422a of the light valve 422.

In summary, the embodiments of the invention may have at least one of the following advantages. The heat conducting structure is disposed on the casing of the optical engine module, and the heat conducting structure is at the at least one side of the front portion of the light valve. The heat generated by the light valve being operated is not only dissipated via the rear end heat dissipation module of the rear portion, but also dissipated via the heat conducting structure at the at least one side of the front portion and the corresponding front end heat dissipation module. As a result, the heat dissipation efficiency of the light valve is enhanced, and the temperature difference between the front portion and the rear portion of the light valve becomes smaller, so as to elongate the operating life of the light valve. In the embodiments of the invention, the heat conducting structure is connected to the casing and receives the heat from the light valve via the casing. Namely, the heat conducting structure is not directly connected to the light valve and is separated from the light valve. Therefore, the assembling/positioning accuracy of the light valve will not be affected by disposing the heat conducting structure, so as to obtain a high projecting quality of the projector. Furthermore, in the embodiments of the invention, the heat conducting structure disposed on the casing could dissipate the heat of the casing effectively so that a high efficiency of heat dissipation of other optical elements disposed inside the casing is obtained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A projector, comprising:
  a light source, configured for providing an illumination beam;
  an optical engine module, comprising:
    a light valve, configured to convert the illumination beam into an image beam, wherein the light valve has a front portion and a rear portion opposite to each other, and a reflective surface located at the front portion;
    a casing, wherein the front portion is connected to the casing; and
    a heat conducting structure, disposed on the casing and at least one side of the front portion, wherein the heat conducting structure is disposed adjacent to the front portion of the light valve and at least partially surrounds the front portion, the heat conducting structure is located between the reflective surface and the rear portion, the heat conducting structure is separated from the light valve, the casing is connected to a first side of the heat conducting structure, and a heat of the front portion of the light valve is sequentially transferred from the casing to the heat conducting structure;
    a front end heat dissipation module, connected to a second side of the heat conducting structure, wherein the first side and the second side of the heat conducting structure are opposite to each other; and
  a projection lens, disposed on the casing and configured to project an image.

2. The projector of claim 1, wherein the optical engine module further comprises a rear end heat dissipation module, and the rear end heat dissipation module is disposed on the rear portion.

3. The projector of claim 1, wherein the optical engine module further comprises at least one thermoelectric cooler, and the thermoelectric cooler is disposed between the casing and the heat conducting structure.

4. The projector of claim 1, wherein the front end heat dissipation module comprises:
  a heat dissipation fin set; and
  at least one heat pipe, connected between the heat conducting structure and the heat dissipation fin set.

5. The projector of claim 1, wherein the front end heat dissipation module comprises:
  a heat dissipation fin set; and at least one water-cooling pipe, connected between the heat conducting structure and the heat dissipation fin set.

6. The projector of claim 1, wherein the optical engine module further comprises an off ray receiving plate, the off ray receiving plate is disposed on the casing and configured to receive an off ray from the light valve, and at least one portion of the heat conducting structure is located between the front portion and the off ray receiving plate.

7. An optical engine module, comprising:
a light valve, having a front portion and a rear portion opposite to each other, and a reflective surface located at the front portion;
a casing, wherein the front portion is connected to the casing;
a heat conducting structure, disposed on the casing, wherein the heat conducting structure is disposed adjacent to the front portion of the light valve and at least partially surrounds the front portion, the heat conducting structure is located between the reflective surface and the rear portion, the heat conducting structure is separated from the light valve, the casing is connected to a first side of the heat conducting structure, and a heat of the front portion of the light valve is sequentially transferred from the casing to the heat conducting structure; and
a front end heat dissipation module, connected to a second side of the heat conducting structure, wherein the first side and the second side of the heat conducting structure are opposite to each other.

8. The optical engine module of claim 7, further comprising a rear end heat dissipation module, wherein the rear end heat dissipation module is disposed on the rear portion.

9. The optical engine module of claim 7, further comprising at least one thermoelectric cooler, wherein the thermoelectric cooler is disposed between the casing and the heat conducting structure.

10. The optical engine module of claim 7, wherein the front end heat dissipation module comprises:
a heat dissipation fin set; and
at least one heat pipe, connected between the heat conducting structure and the heat dissipation fin set.

11. The optical engine module of claim 7, wherein the front end heat dissipation module comprises:
a heat dissipation fin set; and
at least one water-cooling pipe, connected between the heat conducting structure and the heat dissipation fin set.

12. The optical engine module of claim 7, further comprising an off ray receiving plate, wherein the off ray receiving plate is disposed on the casing and configured to receive an off ray from the light valve, at least one portion of the heat conducting structure is located between the front portion and the off ray receiving plate.

* * * * *